(12) United States Patent
Sorkin et al.

(10) Patent No.: US 11,862,963 B2
(45) Date of Patent: Jan. 2, 2024

(54) ELECTRICAL SYSTEM REDUNDANT OVERVOLTAGE PROTECTION

(71) Applicant: Safran Power USA, LLC, Twinsburg, OH (US)

(72) Inventors: Lev Sorkin, Cranford, NJ (US); Priyanka D. Shivthare, Ocean, NJ (US)

(73) Assignee: Safran Power USA, LLC, Twinsburg, OH (US)

( * ) Notice: Subject to any disclaimer, the term of this patent is extended or adjusted under 35 U.S.C. 154(b) by 273 days.

(21) Appl. No.: 17/297,559

(22) PCT Filed: Nov. 30, 2018

(86) PCT No.: PCT/US2018/063339
§ 371 (c)(1),
(2) Date: May 27, 2021

(87) PCT Pub. No.: WO2020/112139
PCT Pub. Date: Jun. 4, 2020

(65) Prior Publication Data
US 2021/0399542 A1 Dec. 23, 2021

(51) Int. Cl.
*H02H 7/06* (2006.01)
*H02P 29/024* (2016.01)
*H02P 9/10* (2006.01)

(52) U.S. Cl.
CPC ............. *H02H 7/065* (2013.01); *H02P 9/10* (2013.01); *H02P 29/0241* (2016.02)

(58) Field of Classification Search
CPC .... H02P 9/30; H02P 9/006; H02P 9/10; H02P 9/08; H02P 9/305; H02P 9/102;
(Continued)

(56) References Cited

U.S. PATENT DOCUMENTS

| 4,103,217 A | 7/1978 | Auinger et al. |
| 2002/0131225 A1* | 9/2002 | Barrow .................. H02H 5/044 361/103 |

(Continued)

FOREIGN PATENT DOCUMENTS

| CN | 203339667 U | 12/2013 |
| EP | 2482445 A2 | 8/2012 |

OTHER PUBLICATIONS

International Patent Application No. PCT/US2018/063339, International Search Report and Written Opinion, dated Aug. 23, 2019.

*Primary Examiner* — Bryan R Perez
(74) *Attorney, Agent, or Firm* — Kilpatrick Townsend & Stockton LLP (57) ABSTRACT

Described is a method including monitoring a point of regulation voltage input to a generator control unit and monitoring a generator output voltage as a backup point of regulation voltage input. The method also includes detecting an overvoltage fault at the point of regulation voltage input, the backup point of regulation voltage input, or both. Additionally, the method includes opening a first solid-state switch (110) in response to detecting the overvoltage fault. Opening the first solid-state switch (110) prevents provision of an input signal (104) to a generator excitation field (102). Further, the method includes opening a generator excitation field relay (112) in response to detecting the overvoltage fault. Opening the excitation field relay (112) also prevents provision of the input signal (104) to the generator excitation field (102).

20 Claims, 3 Drawing Sheets

(58) Field of Classification Search
CPC ...... H02P 9/48; H02P 9/02; H02P 9/14; H02P 9/00; H02P 9/105; H02P 9/123; H02H 7/06; H02H 7/065; H02H 7/062; H02H 7/122; H02H 7/0805; H02H 7/0811; H02H 7/1252; H02H 7/067
See application file for complete search history.

(56) References Cited

U.S. PATENT DOCUMENTS

2012/0106007 A1\* 5/2012 Beneditz ............ H02P 29/0241
361/18
2013/0329329 A1\* 12/2013 Liu ........................ H02H 9/02
307/9.1

\* cited by examiner

ELECTRICAL SYSTEM REDUNDANT OVERVOLTAGE PROTECTION

TECHNICAL FIELD

The field of the present disclosure relates to redundant overvoltage protection of an electrical system. More specifically, the present disclosure relates to redundant overvoltage protection systems and methods used to control application of power to a generator excitation field of a power generation system used to power an electrical system.

BACKGROUND

Power generators may be used to convert motive power to electrical power. The electrical power generated by the power generator may be used to power an electrical system. In an example, the electrical system may be a system for operation of an aircraft or other vehicle. Other electrical systems not associated with vehicles may also receive electrical power from the power generators.

An overvoltage fault may be generated when the power generator supplies electrical power to the electrical system with a voltage that is greater than a design limit of the electrical system. Extended overvoltage events may result in detrimental effects on the electrical system and any equipment in electrical communication with the electrical system. In aircraft environments, or any other environments with critical electrical systems, such overvoltage events may lead to a loss in operability of the entire environment. Further, techniques for removing the overvoltage fault from the electrical system may lack reliability due to a lack of redundancies in overvoltage fault mitigation.

SUMMARY

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the subject matter covered by this patent are defined by the claims below, not this summary. This summary is a high-level overview of various aspects of the subject matter of the present disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a method may include monitoring a point of regulation voltage input to a generator control unit. The method may also include monitoring a generator output voltage as a backup point of regulation voltage input and detecting an overvoltage fault at the point of regulation voltage input, the backup point of regulation voltage input, or both. Further, the method may include opening a first solid-state switch in response to detecting the overvoltage fault to prevent provision of an input signal to a generator excitation field. Furthermore, the method may include opening a generator excitation field relay in response to detecting the overvoltage fault to prevent provision of the input signal to the generator excitation field.

According to certain embodiments of the present disclosure, a system may include a first voltage sensor that monitors a point of regulation voltage and a second voltage sensor that monitors a generator output voltage of a generator. The system may also include a generator excitation field relay electrically coupled between a generator excitation field of the generator and a power source of the generator excitation field. The generator excitation field relay may be controllable to open when the first voltage sensor detects an overvoltage condition from the point of regulation voltage, the second voltage sensor detects an overvoltage condition from the generator output voltage, or both. Additionally, the system may include a deenergizing circuit. In an example, the deenergizing circuit may include a logic gate that receives one or more fault indication signals from the first voltage sensor, the second voltage sensor, or both. The deenergizing circuit may also include a first solid-state switch that opens when the logic gate receives at least one of the one or more fault indication signals. Opening the first solid-state switch results in deenergizing the generator excitation field.

According to certain embodiments of the present disclosure, a method may include monitoring a point of regulation voltage input to a generator control unit. The method may also include monitoring a generator output voltage as a backup point of regulation voltage input. Additionally, the method may include detecting an overvoltage fault at the point of regulation voltage input, the backup point of regulation voltage input, or both. Further, the method may include opening a first solid-state switch at a blocking circuit using analog control to prevent provision of an input signal to a generator excitation field. The first solid-state switch may be opened when a voltage of the input signal is above a voltage threshold that induces the generator output voltage to an overvoltage fault value. Furthermore, the method may include opening a generator excitation field relay in response to detecting the overvoltage fault

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain aspects and examples of the disclosure relate to redundant overvoltage protection systems and methods used to control application of power to a generator excitation field of a power generation system that is used to power an electrical system. The generator excitation field may be a component of a power generator. The power generator may be used to provide power to an electrical system, such as an aircraft electrical system. The redundant overvoltage protection system may be operated to prevent prolonged exposure of the electrical system to an overvoltage event of the generator. For example, the generator may experience an overvoltage fault condition. Upon detection of the overvoltage fault condition, the redundant overvoltage protection system may provide redundant techniques to remove application of overvoltage power to the electrical system.

To improve a likelihood that an overvoltage protection system will detect and act on the overvoltage condition of the generator, the redundant overvoltage protection system provides multiple detection and power isolation redundancies. For example, the overvoltage condition may be measured at multiple locations (e.g., at an output of the generator and at a point of regulation of the generator). Further, the redundant overvoltage protection system may disconnect a generator excitation field of the generator from a power source at multiple locations along a path between the power source and the generator excitation field. Such redundancies provide multiple dissimilar protection paths for overvoltage protection of the electrical system.

The described embodiments provide a redundant overvoltage protection system that controls a power output of a generator to an electrical system during an overvoltage event. While the redundant overvoltage protection system is discussed generally for use with an aircraft electronics system, it is by no means so limited. Rather, embodiments of the redundant overvoltage protection system may be used with electrical systems of any type or otherwise as desired.

Figure 1:
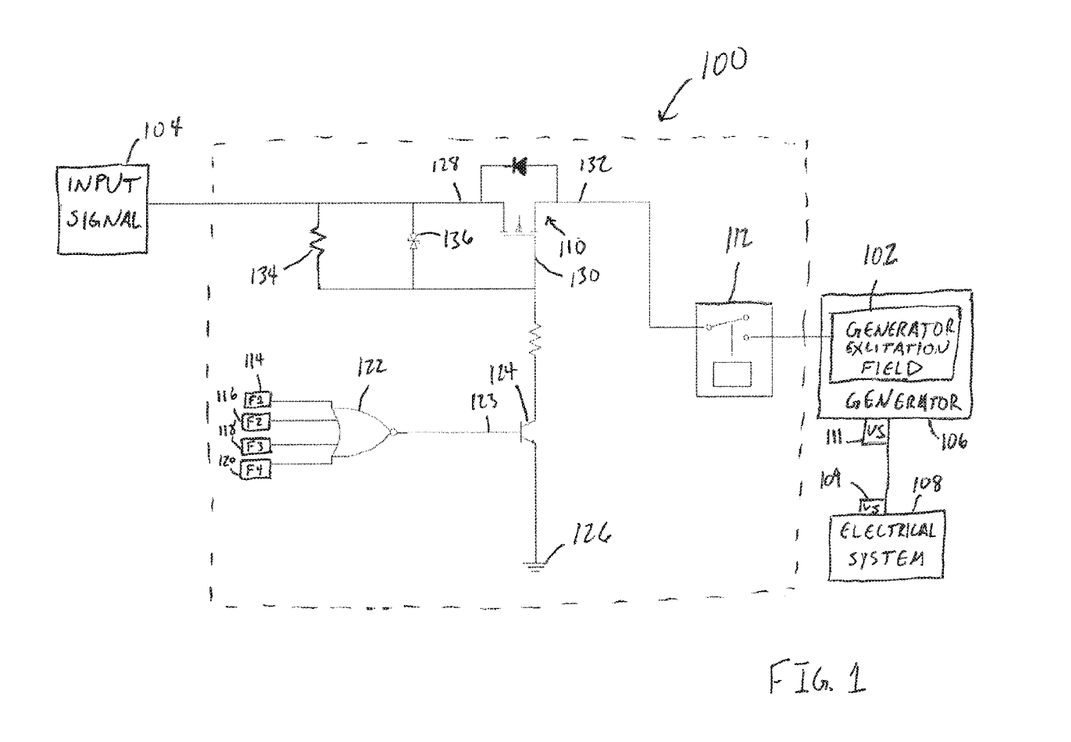
FIG. 1 is a schematic diagram of a redundant overvoltage protection system used to control application of power to a generator excitation field, according to certain embodiments of the present disclosure.

FIG. 1 is a schematic diagram of a redundant overvoltage protection system 100 used to control application of power to a generator excitation field 102. The overvoltage protection system 100 receives an input signal 104 from a power source (not shown) and supplies the input signal 104 to the generator excitation field 102 of a generator 106 when a voltage generated by the generator 106 is less than an overvoltage threshold set by the overvoltage protection system 100. For example, the overvoltage protection system 100 may limit providing power from the input signal 104 to the generator excitation field 102 during an overvoltage event of the generator 106 to limit negative effects on an electrical system 108 due to the overvoltage event. By not providing power from the input signal 104 to the generator excitation field 102, a voltage output to the electrical system 108 by the generator 106 is reduced below the overvoltage threshold because the generator 106 is no longer generating power due to a lack of excitation at the generator excitation field 102. Thus, the overvoltage protection system 100 may be referred to as a deenergizing circuit due to the removal of a power source (i.e., the input signal 104) from the generator excitation field 102 that results in deenergizing the generator 106.

As illustrated, the overvoltage protection system 100 includes two signal disconnect points capable of disconnecting the input signal 104 from the generator excitation field 102. A solid-state switch 110, which may be a p channel metal-oxide-semiconductor field-effect transistor (MOS-FET) or any other suitable solid-state switch, may provide a first disconnect point between the input signal 104 and the generator excitation field 102. Additionally, a generator excitation field relay 112 (i.e., the field relay 112) may provide a second disconnect point between the input signal 104 and the generator excitation field 102. The field relay 112 may be any type of electrically operated switch capable of closing during normal operation of the generator 106 and opening during a detected fault condition.

Overvoltage faults may be detected at multiple voltage detection locations. For example, a point of regulation voltage, which may be a voltage received by a generator control unit within the electrical system 108 or within another electrical system coupled to the generator 106, may be detected by a voltage sensor 109 and used as the voltage detection location to determine an overvoltage fault. In an example, a backup voltage detection location may also be used. The backup voltage detection location may be a voltage measured by a voltage sensor 111 directly at an output of the generator 106. Other voltage detection locations associated with the generator 106 may also be used to determine an overvoltage event. The backup voltage detection location (e.g., at the output of the generator 106) may provide a voltage that is slightly higher than the point of regulation voltage received at the generator control unit (e.g., due to a voltage drop across feeder cables between the generator 106 and the point of regulation). Accordingly, the overvoltage threshold for a voltage measured at the backup voltage detection location may be a corresponding amount higher than the overvoltage threshold associated with the point of regulation voltage.

An overvoltage value detected at either the point of regulation or the backup voltage detection location may result in disconnecting the input signal 104 from the generator excitation field 102. When a signal or other connection is lost between the overvoltage protection system 100 and the point of regulation, a signal from the backup voltage detection location may still provide an indication of an overvoltage condition at the generator 106. Thus, an overvoltage fault provided to the electrical system 108 may be avoided provided that the overvoltage protection system 100 receives data associated with a point of regulation voltage signal and a backup voltage detection location voltage signal.

The signals from the point of regulation and the backup voltage detection location may be provided to or converted by the overvoltage protection system 100 into a Boolean value of 0 or 1 depending on whether the signals are below or exceed an overvoltage threshold. Other faults associated with the generator 106 may also be fed to the overvoltage protection system 100. For example, an overheating indication, a short indication, voltage regulation disable condition indications, power supply failure event indications, or any other faults associated with the generator 106 or the electrical system 108 may be provided to the overvoltage protection system 100 to initiate removal of the input signal 104 to the generator excitation field 102.

Boolean values associated with the fault indications, both overvoltage faults and otherwise, are provided to fault inputs 114, 116, 118, and 120. More or fewer fault inputs 114-120 are contemplated within the scope of the present disclosure. Two of the fault inputs 114 and 116 may be associated with a point of regulation overvoltage determination and a backup voltage detection location overvoltage determination, respectively. The additional fault inputs 118 and 120 may be associated with any other detectable faults that may benefit from removal of the input signal 104 to the generator excitation field 102 (e.g., temperature of the generator 106, other health indicators of the generator 106, health indicators of the electrical system 108, etc.). The fault inputs 114-120 may be provided as Boolean values from the generator control unit associated with the generator 106. For example, the generator control unit may receive measurements indicative of a fault and convert the measurements to a Boolean value that is provided to the fault inputs 114-120. In another example, the overvoltage protection system 100 may receive data signals representing the point of regulation voltage or the backup voltage detection location voltage and convert the received data to a Boolean value that is provided to the fault inputs 114-120.

The fault inputs 114-120 are provided to a NOR logic gate 122. The NOR logic gate 122 provides a high signal to a base 123 of a solid-state switch 124, which may be an NPN bipolar transistor or other solid-state switching device, when the fault inputs 114-120 are all at a low value (e.g., no fault is present at any of the fault inputs 114-120). The high signal provided to the solid-state switch 124 turns the solid-state switch to an on state, which enables passage of current to ground 126. If any or all of the fault inputs 114-120 have a high value (e.g., indicating that a fault is present), the NOR logic gate 122 provides a low signal to the base 123, and the solid-state switch 124 transitions to an off state. The off state of the solid-state switch 124 removes a path for the current to flow to the ground 126.

While the NOR logic gate 122 is depicted in FIG. 1, other logic gates may also be used in place of the NOR logic gate 122. For example, an AND logic gate may be used in place of the NOR logic gate 122 if signals indicating faults are provided to the fault inputs 114-120 as low signals. In such an example, any low input, which indicates a fault, to the fault inputs 114-120 may result in the solid-state switch 124 transitioning to an off state.

The solid-state switch 124 may control operation of the solid-state switch 110. For example, the p-channel MOSFET depicted as the solid-state switch 110 may enter a saturation mode (i.e., a fully on state) when two conditions are met. The first condition is that a voltage differential between a source 128 and a gate 130 of the solid-state switch 124 is greater than an absolute value of a threshold voltage of the solid-state switch 124. The second condition is that a voltage differential between the source 128 and a drain 132 of the solid-state switch 124 is greater than the voltage differential between the source 128 and the gate 130 less the absolute value of the threshold voltage of the solid-state switch 124. The solid-state switch 124 in an on state may enable a voltage drop across resistor 134 that is sufficient to meet the voltage differential between the source 128 and the gate 130 of the solid-state switch 110 for the solid-state switch 110 to operate in a saturation mode. Operation of the solid-state switch 110 in the saturation mode may result in the solid-state switch 110 functioning as a closed switch that enables the input signal 104 to traverse the solid-state switch 110. When the fault inputs 114-120 all provide a low signal to the NOR logic gate 122 (i.e., there are no detected faults), the solid-state switch 124 remains in an on state resulting in the solid-state switch 110 also remaining in an on state.

If one or more of the fault inputs 114-120 provide a high signal to the NOR logic gate 122 (i.e., a fault is detected), then the solid-state switch 124 transitions to an off state. The off state of the solid-state switch 124 removes a path for current associated with the input signal 104 to travel to the ground 126. Because the path to the ground 126 is removed, the gate 130 of the solid-state switch 110 becomes floating. Therefore, the voltage differential between the source 128 and the gate 130 is zero, and the solid-state switch operates in a cut-off mode. The cut-off mode indicates that the solid-state switch 110 no longer provides a path along which the input signal 104 is able to traverse. That is, the solid-state switch 110 functions as an open circuit. Thus, upon any indication of a fault received at the fault inputs 114-120, the solid-state switch 110 will remove application of the input signal 104 to the generator excitation field 102.

A bidirectional transient-voltage-suppression (TVS) diode 136 may be positioned in parallel with the resistor 134. The bidirectional TVS diode 136 may acknowledge an overvoltage condition at the source 128 of the solid-state switch 110 by shunting excess current when the overvoltage condition exceeds an avalanche breakdown potential of the bidirectional TVS diode 136 and thus protecting the gate 130 of the solid state switch 110. The bidirectional TVS diode 136 may be chosen to correspond with an overvoltage threshold of the electrical system 108. That is, the bidirectional TVS diode 136 may prevent or limit damage to the solid state switch 110 during the overvoltage condition when the input signal 104 provided to the generator excitation field 102 results in an output voltage of the generator 106 provided to the electrical system 108 that exceeds the overvoltage threshold of the electrical system 108.

The bidirectional TVS diode 136 may respond to the overvoltage condition in a manner quicker than the solid-state switches 110 and 124. However, extended overvoltage events experienced by the bidirectional TVS diode 136 may result in failure of the bidirectional TVS diode 136. Thus, the solid-state switches 110 and 124 may react to the overvoltage event prior to failure of the bidirectional TVS diode 136.

By removing the input signal 104 from the generator excitation field 102 with the solid-state switch 110, the field relay 112 may be opened with minimal potential for the field relay 112 to weld in a closed position due to an arc created during an attempt to open the field relay 112. Thus, the field relay 112 may be opened upon detection of an overvoltage fault after the solid-state switch 110 transitions to the cut-off mode to provide a redundant disconnect location between the input signal 104 and the generator excitation field 102. When the overvoltage condition lapses, the field relay 112 and the solid-state switch 110 may both transition to a conductive state to recommence conducting the input signal 104 to the generator excitation field 102.

Figure 2:
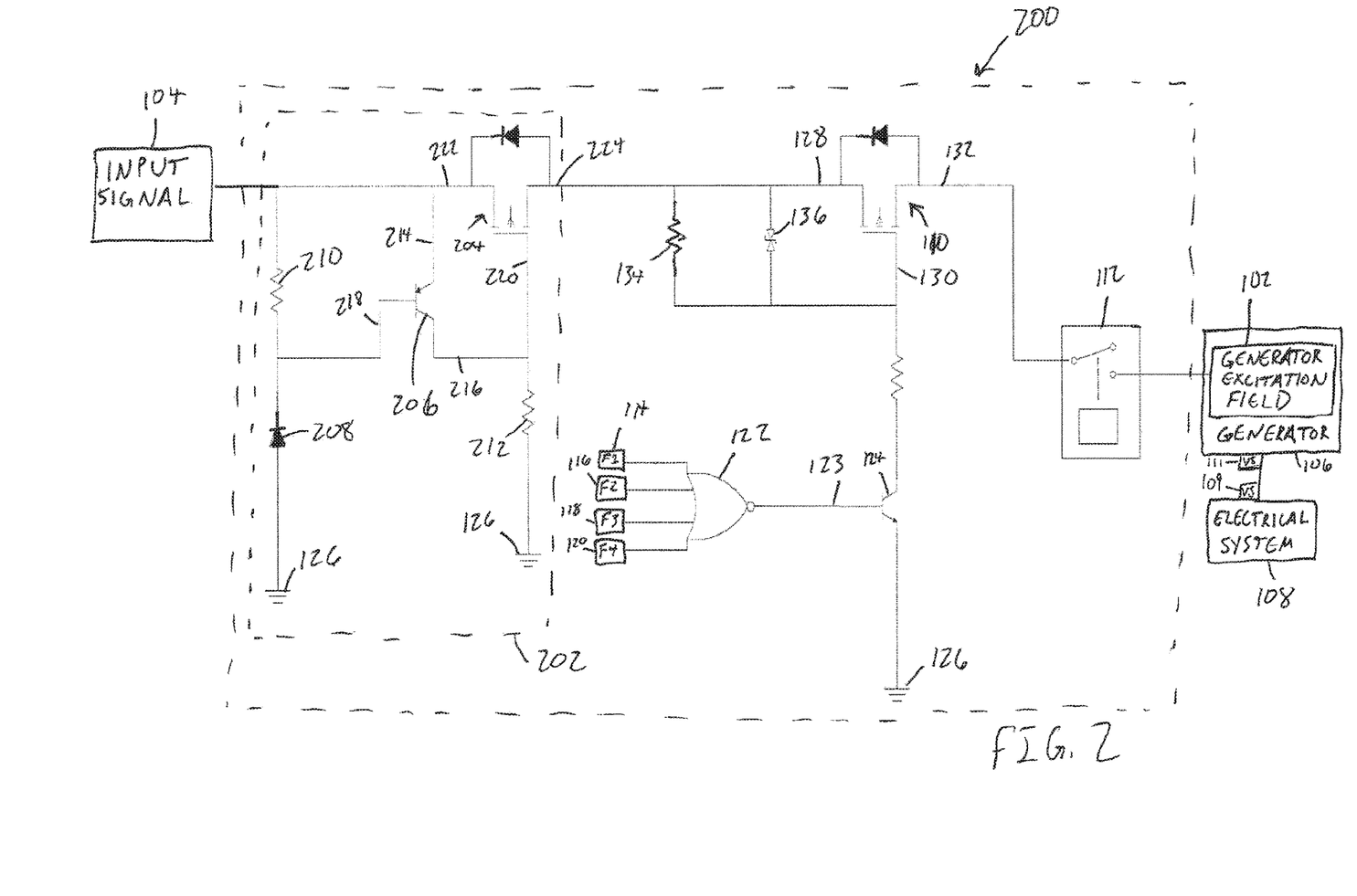
FIG. 2 is a schematic diagram of an additional redundant overvoltage protection system used to control application of power to a generator excitation field, according to certain embodiments of the present disclosure.

FIG. 2 is a schematic diagram of an additional redundant overvoltage protection system 200 used to control application of power to a generator excitation field. The redundant overvoltage protection system 200 includes the components of the redundant overvoltage protection system 100 with an additional layer of redundancy provided by a blocking circuit 202. The blocking circuit 202 is tuned to block provision of the input signal 104 to the generator excitation field 102 at a solid-state switch 204, which may be a p-channel MOSFET or any other suitable switching device, using analog control when the input signal 104 induces the generator 106 to output a voltage to the electrical system 108 that exceeds an overvoltage threshold of the electrical system 108.

To accomplish blocking provision of the input signal 104 to the generator excitation field 102, the blocking circuit 202 includes a solid-state switch 206, a diode 208, and resistors 210 and 212. The solid-state switch 206, which may be a PNP BJT transistor or any other suitable solid-state switch, conducts from an emitter 214 to a collector 216 when a signal supplied to a base 218 of the solid-state switch 206 is low. Further, the solid-state switch 206 is a near ideal insulator between the emitter 214 and the collector 216 when the signal supplied to the base 218 is high. That is, when the voltage applied to the base 218 is too similar to a voltage applied to the emitter 214, the solid-state switch 206 does not transmit current from the emitter 214 to the collector 216 (e.g., the solid-state switch 206 is in an off state). Alternatively, when the voltage applied to the base 218 is a threshold amount less than the voltage applied to the emitter 214, the solid-state switch 206 conducts current from the emitter 214 to the collector 216 (e.g., the solid-state switch 206 is in an on state).

To establish when the solid-state switch 206 transitions between the on state and the off state, the diode 208 is positioned between the base 218 and the ground 126. The diode 208, which may be a PN junction diode, a Zener diode, or any other type of diode, may have a breakdown voltage or Zener voltage tuned to a voltage level of the input signal 104 provided to the generator excitation field 102 that generates an overvoltage condition output by the generator 106 to the electrical system 108. For example, when the overvoltage rating of the electrical system 108 is 28V, the diode 208 may be selected based on a breakdown voltage or a Zener voltage of the diode 208 that is equal to a voltage of the input signal 104 that induces the overvoltage output at the generator 106.

When the input signal 104 has a voltage that is less than the breakdown or Zener voltage of the diode 208, the solid-state switch 206 may be in an off state. Because the solid-state switch 206 is in an off state, a voltage at the collector 216 of the solid-state switch 206 is equal to ground. Accordingly, a voltage applied to a gate 220 of the solid-state switch 204 is ground, and the solid-state switch 204 is conductive from a source 222 to a drain 224 of the solid-state switch 204.

When the input signal 104 has a voltage that is greater than the breakdown or Zener voltage of the diode 208, the solid-state switch 206 may be in an on state. Because the solid-state switch 206 is in an on state, a voltage at the collector 216 of the solid-state switch 206 is equal to a voltage at the emitter 214 of the solid-state switch 206 less a small voltage drop associated with the solid-state switch 206. Accordingly, a voltage applied to the gate 220 of the solid-state switch 204 is a high signal, and the solid-state switch 204 blocks conductivity from the source 222 to the drain 224 of the solid-state switch 204. Thus, the blocking circuit 202 is able to automatically block provision of the input signal 104 to the generator excitation field 102 when the input signal 104 is likely to induce an overvoltage event at the generator 106.

Similar to the overvoltage protection system 100 discussed above with respect to FIG. 1, the overvoltage protection system 200 includes two additional signal disconnect points capable of disconnecting the input signal 104 from the generator excitation field 102. The solid-state switch 110 may provide the first additional disconnect point between the input signal 104 and the generator excitation field 102. Additionally, the field relay 112 may provide the second additional disconnect point between the input signal 104 and the generator excitation field 102. The field relay 112 may be any type of electrically operated switch capable of closing during normal operation of the generator 106 and opening during a detected fault condition.

Overvoltage faults may be detected at multiple voltage detection locations. For example, a point of regulation voltage, which may be a voltage received by a generator control unit within the electrical system 108 or other electrical system coupled to the generator 106, may be detected by the voltage sensor 109 and used as the voltage detection location to determine an overvoltage fault. In an example, a backup voltage detection location may also be used. The backup voltage detection location may be a voltage detected by the voltage sensor 111 and measured directly at an output of the generator 106. Other voltage detection locations associated with the generator 106 may also be used to determine an overvoltage event. The backup voltage detection location (e.g., at the output of the generator 106) may provide a voltage that is slightly higher than the point of regulation voltage received at the generator control unit (e.g., due to a voltage drop across feeder cables between the generator 106 and the point of regulation). Accordingly, the overvoltage threshold for a voltage measured at the backup voltage detection location may be a corresponding amount higher than the overvoltage threshold associated with the point of regulation voltage.

The signals from the point of regulation and the backup voltage detection location may be provided to or converted by the overvoltage protection system 200 as a Boolean value of 0 or 1 depending on whether voltages of the signals are below or exceed an overvoltage threshold. Other faults associated with the generator 106 may also be fed to the overvoltage protection system 200. For example, an overheating indication, a short indication, voltage regulation disable condition indications, power supply failure event indications, or any other faults associated with the generator 106 or the electrical system 108 may be provided to the overvoltage protection system 100 to initiate removal of the input signal 104 to the generator excitation field 102.

Boolean values associated with the fault indications, both overvoltage faults and otherwise, are provided to the fault inputs 114, 116, 118, and 120. More or fewer fault inputs 114-120 are contemplated within the scope of the present disclosure. Two of the fault inputs 114 and 116 may be associated with a point of regulation overvoltage determination and a backup voltage detection location overvoltage determination, respectively. The additional fault inputs 118 and 120 may be associated with any other detectable faults that may be resolved or alleviated by removing the input signal 104 from the generator excitation field 102.

The fault inputs 114-120 are provided to the NOR logic gate 122. The NOR logic gate 122 provides a high signal to the base 123 of the solid-state switch 124, which may be an NPN BJT or other solid-state switching device, when the fault inputs 114-120 are all at a low value (e.g., no fault is present at any of the fault inputs 114-120). The high signal provided to the solid-state switch 124 turns the solid-state switch to an on state, which enables passage of current to the ground 126. If any or all of the fault inputs 114-120 have a high value (e.g., indicating that a fault is present), the NOR logic gate 122 provides a low signal to the base 123, and the solid-state switch 124 transitions to an off state. The off state of the solid-state switch 124 removes a path for the current to the ground 126.

While the NOR logic gate 122 is depicted in FIG. 1, other logic gates may also be used in place of the NOR logic gate 122. For example, an AND logic gate may be used in place of the NOR logic gate 122 if signals indicating faults are provided to the fault inputs 114-120 as low signals. In such an example, any low input, which indicates a fault, to the fault inputs 114-120 may result in the solid-state switch 124 transitioning to an off state.

The solid-state switch 124 may control operation of the solid-state switch 110. For example, the p-channel MOSFET depicted as the solid-state switch 110 may enter a saturation mode (i.e., a fully on state) when two conditions are met.

The first condition is that a voltage differential between the source 128 and the gate 130 of the solid-state switch 124 is greater than an absolute value of a threshold voltage of the solid-state switch 124. The second condition is that a voltage differential between the source 128 and the drain 132 of the solid-state switch 124 is greater than the voltage differential between the source 128 and the gate 130 less the absolute value of the threshold voltage of the solid-state switch 124. The solid-state switch 124 in an on state may enable a voltage drop across the resistor 134 that is sufficient to meet the voltage differential between the source and the gate of the solid-state switch 110 for the solid-state switch 110 to operate in a saturation mode. Operation of the solid-state switch 110 in the saturation mode may result in the solid-state switch 110 functioning as a closed switch such that the input signal 104 is able to traverse the solid-state switch 110. Accordingly, when the fault inputs 114-120 are all providing a low signal to the NOR logic gate 122 (i.e., there are no detected faults), the solid-state switch 110 may remain in an on position.

If one or more of the fault inputs 114-120 provide a high signal to the NOR logic gate 122 (i.e., a fault is detected), then the solid-state switch 124 transitions to an off state. The off state of the solid-state switch 124 removes a path for current associated with the input signal 104 to travel to the ground 126. Because the path to the ground 126 is removed, the gate 130 of the solid-state switch 110 becomes floating. Therefore, the voltage differential between the source 128 and the gate 130 is zero, and the solid-state switch operates in a cut-off mode. The cut-off mode indicates that the solid-state switch 110 no longer provides a path along which the input signal 104 is able to traverse to the generator excitation field 102. That is, the solid-state switch 110 functions as an open circuit. Thus, upon any indication of a fault at the fault inputs 114-120, the solid-state switch 110 will remove application of the input signal 104 to the generator excitation field 102.

The bidirectional TVS diode 136 may be positioned in parallel with the resistor 134. In an example, the bidirectional TVS diode 136 detects an overvoltage condition at the source 128 of the solid-state switch 110 by shunting excess current when the overvoltage condition exceeds an avalanche breakdown potential of the bidirectional TVS diode 136 to protect the gate 130 of the solid state switch 110. The bidirectional TVS diode 136 may be chosen to correspond with an overvoltage threshold of the electrical system 108. That is, the bidirectional TVS diode 136 may prevent or limit damage to the solid state switch when the input signal 104 provided to the generator excitation field 102 results in an output voltage of the generator 106 that exceeds the overvoltage threshold of the electrical system 108.

The bidirectional TVS diode 136 may respond to the overvoltage condition in a manner quicker than the solid-state switches 110 and 124. However, extended overvoltage events experienced by the bidirectional TVS diode 136 may result in failure of the bidirectional TVS diode 136. Thus, the solid-state switches 110 and 124 may react to the overvoltage event prior to failure of the bidirectional TVS diode 136.

By removing the input signal 104 from the generator excitation field 102 with the solid-state switches 110 and 204, the field relay 112 may be opened in a manner that avoids welding the field relay 112 in a closed position due to creation of an arc during an attempt to open the field relay 112. Thus, the field relay 112 may be opened upon detection of an overvoltage fault after the solid-state switch 110, the solid-state switch 204, or both transition to the cut-off modes to provide a redundant disconnect location between the input signal 104 and the generator excitation field 102. When the overvoltage condition lapses, the field relay 112, the solid-state switch 110, and the solid-state switch 204 may each transition to a conductive state to conduct the input signal 104 to the generator excitation field 102.

Figure 3:
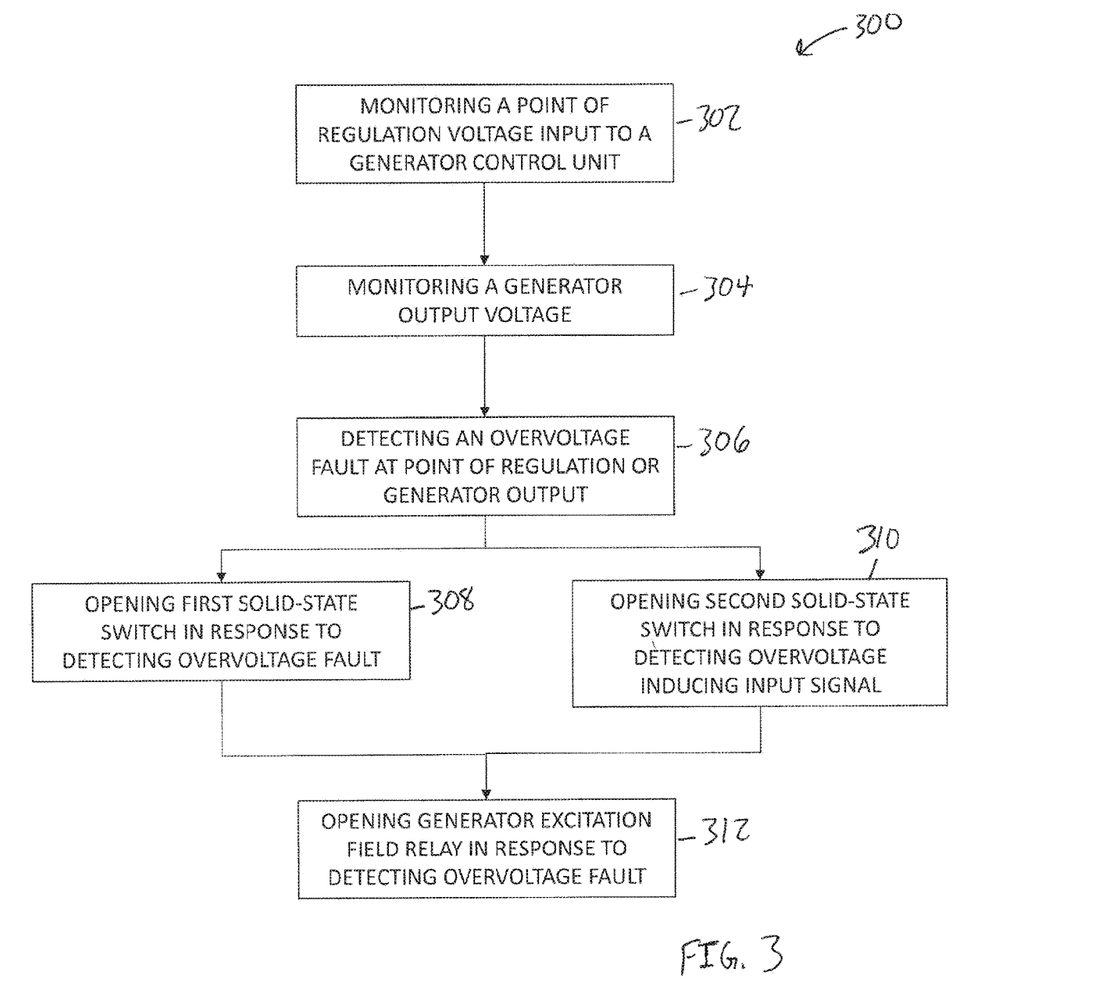
FIG. 3 is a flowchart of a process for controlling the redundant overvoltage protection systems of FIGS. 1 and 2, according to certain embodiments of the present disclosure.

FIG. 3 is a flowchart of a process 300 for controlling the redundant overvoltage protection systems 100 and 200. As discussed above, an overvoltage condition of an output of the generator 106 to the electrical system 108 may have negative effects on the operation of the electrical system 108. Accordingly, the redundant overvoltage protection systems 100 and 200 provide functionality that detect and limit the overvoltage conditions from being generated by the generator 106.

At block 302, the process 300 involves monitoring a point of regulation voltage that is input to a generator control unit of the electrical system 108. As discussed above, the point of regulation voltage may be the voltage output by the generator 106 and used to power the electrical system 108. The electrical system 108 may experience negative effects when the point of regulation voltage exceeds an overvoltage rating or threshold of the electrical system 108.

At block 304, the process 300 involves monitoring an output voltage of the generator 106. The output voltage of the generator 106, which may be referred to as a backup point of regulation voltage, may be slightly higher than the point of regulation voltage because the output voltage of the generator 106 has not experienced a voltage drop associated with a resistance of power transmission lines from the generator 106 to the electrical system 108. The output voltage of the generator 106 provides a redundant and dissimilar location for the redundant overvoltage protection systems 100 and 200 to monitor the generator 106 for overvoltage conditions. Other locations associated with the generator 106 may also be monitored for overvoltage conditions.

At block 306, the process 300 involves detecting an overvoltage fault at the point of regulation, at the output of the generator 106, or both. Because the voltage at the output of the generator may be slightly greater than the actual voltage received at the electrical system 108, the overvoltage measurement at the output of the generator 106 may take into account the expected slightly elevated voltage levels when determining whether there is an overvoltage condition. If an overvoltage condition is detected, a fault indication may be provided to the fault inputs 114-120 to control the solid-state switch 110 to remove the input signal 104 from the generator excitation field 102.

At block 308, the process 300 involves opening the solid-state switch 110 in response to detecting the overvoltage fault. As mentioned above, the fault inputs 114-120 may provide a positive fault identification to the NOR logic gate 122. With the positive fault identification, the solid-state switch 124 is opened. In opening the solid-state switch 124, the solid-state switch 110 is also opened, which prevents provision of the input signal 104 to the generator excitation field 102. Removal of the input signal 104 from the generator excitation field 102 prevents the excitation of the generator excitation field 102 and ultimately generation of power by the generator 106. Accordingly, providing overvoltage power to the electrical system 108 is avoided.

At block 310, the process 300 involves opening the solid-state switch 204 in response to detecting an input signal 104 supplied to the generator excitation field 102 that is likely to induce an overvoltage fault at the point of regulation or the backup point of regulation. As discussed above, the blocking circuit 202 causes the solid-state switch 204 to open when a voltage of the input signal 104 exceeds a breakdown voltage or Zener voltage of the diode 208. Accordingly, the diode 208 may be selected such that the breakdown voltage or the Zener voltage of the diode 208 is a voltage value provided by the input signal 104 to the generator excitation field 102 that induces an overvoltage output by the generator 106. When the voltage value of the input signal 104 exceeds the breakdown voltage or the Zener voltage, the solid-state switch 204 automatically removes application of the input signal 104 to the generator excitation field 102. It may be appreciated that, in an example, block 308 may be performed as part of the process 300 without also performing block 310. Likewise, block 310 may be performed as part of the process 300 without also performing block 308. As used herein, the term "opening," as it relates to the operation of the solid-state switches 110, 124, 204, and 206, may refer to the solid-state switches operating in an off mode or cut-off mode. Similarly, the term "closing," as it relates to the operation of the solid-state switches 110, 124, 204, and 206, may refer to the solid-state switches operating in a fully on state or a saturation mode.

At block 312, the process 300 involves opening the generator excitation field relay 112 in response to detecting the overvoltage fault. In an example, block 312 may be completed after block 308, block 310, or both are performed. For example, a possibility of inadvertently welding the field relay 112 in a closed position with an arc generated when the field relay 112 attempts to open is avoided by removing application of the input signal 104 to the generator excitation field 102 using the solid-state switches 110 and 204. Thus, removing the input signal 104 prior to attempting to open the field relay 112 may result in greater reliability of the operation of the field relay 112.

In another example, the field relay 112 may be opened at any time upon detection of the overvoltage condition (e.g., before, during, or after opening the solid-state switches 110 and 204). In such an example, the field relay 112 functions as an additional disconnect location for the application of the input signal 104 to the generator excitation field 102 when an overvoltage condition at the generator 106 is detected. Thus, the combination of the field relay 112 with the solid-state switches 110 and 204 provide multiple redundant disconnect locations to ensure the input signal 104 is removed from the generator excitation field 102 upon detection of the overvoltage event.

In the following, further examples are described to facilitate the understanding of the subject matter of the present disclosure:

As used below, any reference to a series of examples is to be understood as a reference to each of those examples disjunctively (e.g., "Examples 1-4" is to be understood as "Examples 1, 2, 3, or 4").

Example 1 is a method, comprising: monitoring a point of regulation voltage input to a generator control unit; monitoring a generator output voltage as a backup point of regulation voltage input; detecting an overvoltage fault at the point of regulation voltage input, the backup point of regulation voltage input, or both; opening a first solid-state switch in response to detecting the overvoltage fault to prevent provision of an input signal to a generator excitation field; and opening a generator excitation field relay in response to detecting the overvoltage fault to prevent provision of the input signal to the generator excitation field.

Example 2 is the method of example 1, further comprising: opening a second solid-state switch at a blocking circuit using analog control to prevent provision of the input signal to the generator excitation field, wherein the second solid-state switch is opened when a voltage of the input signal is above a voltage threshold that induces the generator output voltage to an overvoltage fault value.

Example 3 is the method of example 2, wherein the blocking circuit comprises a diode tuned with a breakdown voltage or a Zener voltage equal to the voltage threshold, and a third solid-state switch is closed when the input signal exceeds the voltage threshold, wherein closing the third solid-state switch results in opening the second solid-state switch.

Example 4 is the method of examples 1-3, further comprising: suppressing the input signal at a gate of the first solid-state switch using a transient-voltage-suppression diode when the input signal exceeds an avalanche breakdown potential of the transient-voltage-suppression diode.

Example 5 is the method of examples 1-4, further comprising: receiving an indication of the overvoltage fault at a logic gate; and controlling a second solid-state switch to open using an output of the logic gate, wherein controlling the second solid-state switch to open results in the opening of the first solid-state switch.

Example 6 is the method of examples 1-5, further comprising: opening the first solid-state switch in response to detecting an overheating fault.

Example 7 is the method of examples 1-6, wherein the point of regulation voltage input to the generator control unit comprises a power signal provided to an electrical system of an aircraft.

Example 8 is the method of examples 1-7, wherein opening the generator excitation field relay occurs after opening the first solid-state switch.

Example 9 is the method of examples 1-8, wherein opening the first solid-state switch, opening the generator excitation field relay, or both result in deenergizing the generator excitation field.

Example 10 is a system, comprising: a first voltage sensor configured to monitor a point of regulation voltage; a second voltage sensor configured to monitor a generator output voltage of a generator; a generator excitation field relay electrically coupled between a generator excitation field of the generator and a power source of the generator excitation field, wherein the generator excitation field relay is controllable to open when the first voltage sensor detects an overvoltage condition from the point of regulation voltage, the second voltage sensor detects an overvoltage condition from the generator output voltage, or both; a deenergizing circuit, comprising: a logic gate configured to receive one or more fault indication signals from the first voltage sensor, the second voltage sensor, or both; and a first solid-state switch configured to open when the logic gate receives at least one of the one or more fault indication signals, wherein opening the first solid-state switch results in deenergizing the generator excitation field.

Example 11 is the system of example 10, comprising: a voltage blocking circuit configured to block application of a voltage output from the power source to the generator excitation field, wherein the voltage blocking circuit comprises: a second solid-state switch configured to open when the voltage output of the power source is above a voltage threshold that induces the generator output voltage to an overvoltage fault value.

Example 12 is the system of example 11, wherein the voltage blocking circuit further comprises: a diode comprising a breakdown voltage or a Zener voltage equal to the voltage threshold; and a third solid-state switch configured to control the second solid-state switch to open when the voltage output of the power source exceeds the voltage threshold.

Example 13 is the system of examples 10-12, wherein the logic gate comprises a NOR logic gate, and wherein the deenergizing circuit further comprises: a second solid-state switch controllable by an output of the NOR logic gate, wherein the second solid-state switch causes the first solid-state switch to open when the NOR logic gate receives one of the plurality of fault indication signals.

Example 14 is the system of examples 10-13, wherein the deenergizing circuit further comprises a transient-voltage-suppression diode tuned to suppress an overvoltage condition at a source of the first solid-state switch.

Example 15 is the system of examples 10-14, wherein the plurality of fault indication signals represent indications of faults associated with overvoltage events, overheating events, voltage regulation disable conditions, or power supply failure events.

Example 16 is a method, comprising: monitoring a point of regulation voltage input to a generator control unit; monitoring a generator output voltage as a backup point of regulation voltage input; detecting an overvoltage fault at the point of regulation voltage input, the backup point of regulation voltage input, or both; opening a first solid-state switch at a blocking circuit using analog control to prevent provision of an input signal to a generator excitation field, wherein the first solid-state switch is opened when a voltage of the input signal is above a voltage threshold that induces the generator output voltage to an overvoltage fault value; and opening a generator excitation field relay in response to detecting the overvoltage fault.

Example 17 is the method of example 16, wherein opening the first solid-state switch, opening the generator excitation field relay, or both result in deenergizing the generator excitation field.

Example 18 is the method of examples 16-17, wherein the blocking circuit comprises a diode tuned with a breakdown voltage or a Zener voltage equal to the voltage threshold, a second solid-state switch is closed when the input signal exceeds the voltage threshold, and closing the second solid-state switch results in opening the first solid-state switch.

Example 19 is the method of examples 16-18, wherein opening the generator excitation field relay occurs after opening the first solid-state switch.

Example 20 is the method of examples 16-19, wherein the point of regulation voltage input to the generator control unit comprises a power signal provided to an electrical system of an aircraft Different arrangements of the components depicted in the drawings or described above, as well as components and steps not shown or described are possible. Similarly, some features and sub-combinations are useful and may be employed without reference to other features and sub-combinations. Embodiments of the present subject matter have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. A method, comprising:
monitoring a point of regulation voltage input to a generator control unit;
monitoring a generator output voltage as a backup point of regulation voltage input;
detecting an overvoltage fault at the point of regulation voltage input, the backup point of regulation voltage input, or both;
opening a first solid-state switch in response to detecting the overvoltage fault to prevent provision of an input signal to a generator excitation field;
opening a generator excitation field relay in response to detecting the overvoltage fault to prevent provision of the input signal to the generator excitation field; and
opening a second solid-state switch at a blocking circuit in response to detecting that an input signal to the generator excitation field is above a voltage threshold that induces the generator output voltage to an overvoltage fault value.

2. The method of claim 1, wherein
opening the second solid-state switch at uses analog control to prevent provision of the input signal to the generator excitation field.

3. The method of claim 1, wherein the blocking circuit comprises a diode tuned with a breakdown voltage or a Zener voltage equal to the voltage threshold, and a third solid-state switch is closed when the input signal exceeds the voltage threshold, wherein closing the third solid-state switch results in opening the second solid-state switch.

4. The method of claim 1, further comprising:
suppressing the input signal at a gate of the first solid-state switch using a transient-voltage-suppression diode when the input signal exceeds an avalanche breakdown potential of the transient-voltage-suppression diode.

5. The method of claim 1, further comprising:
receiving an indication of the overvoltage fault at a logic gate; and
controlling a second solid-state switch to open using an output of the logic gate, wherein controlling the second solid-state switch to open results in the opening of the first solid-state switch.

6. The method of claim 1, further comprising:
opening the first solid-state switch in response to detecting an overheating fault.

7. The method of claim 1, wherein the point of regulation voltage input to the generator control unit comprises a power signal provided to an electrical system of an aircraft.

8. The method of claim 1, wherein opening the generator excitation field relay occurs after opening the first solid-state switch.

9. The method of claim 1, wherein opening the first solid-state switch, opening the generator excitation field relay, or both result in deenergizing the generator excitation field.

10. A system, comprising:
a first voltage sensor configured to monitor a point of regulation voltage;
a second voltage sensor configured to monitor a generator output voltage of a generator;
a generator excitation field relay electrically coupled between a generator excitation field of the generator and a power source of the generator excitation field, wherein the generator excitation field relay is controllable to open when the first voltage sensor detects an overvoltage condition from the point of regulation voltage, the second voltage sensor detects an overvoltage condition from the generator output voltage, or a third voltage sensor detects an overvoltage of an input signal to the generator excitation field that induces the generator output voltage to an overvoltage fault value;

a deenergizing circuit, comprising:
  a logic gate configured to receive one or more fault indication signals from the first voltage sensor, the second voltage sensor, or both; and
  a first solid-state switch configured to open when the logic gate receives at least one of the one or more fault indication signals, wherein opening the first solid-state switch results in deenergizing the generator excitation field.

11. The system of claim 10, comprising:
a voltage blocking circuit configured to block application of a voltage output from the power source to the generator excitation field, wherein the voltage blocking circuit comprises:
  a second solid-state switch configured to open when the voltage output of the power source is above a voltage threshold that induces the generator output voltage to an overvoltage fault value.

12. The system of claim 11, wherein the voltage blocking circuit further comprises:
  a diode comprising a breakdown voltage or a Zener voltage equal to the voltage threshold; and
  a third solid-state switch configured to control the second solid-state switch to open when the voltage output of the power source exceeds the voltage threshold.

13. The system of claim 10, wherein the logic gate comprises a NOR logic gate, and wherein the deenergizing circuit further comprises:
  a second solid-state switch controllable by an output of the NOR logic gate, wherein the second solid-state switch causes the first solid-state switch to open when the NOR logic gate receives one of the plurality of fault indication signals.

14. The system of claim 10, wherein the deenergizing circuit further comprises a transient-voltage-suppression diode tuned to suppress an overvoltage condition at a source of the first solid-state switch.

15. The system of claim 10, wherein the plurality of fault indication signals represent indications of faults associated with overvoltage events, overheating events, voltage regulation disable conditions, or power supply failure events.

16. A method, comprising:
  monitoring a point of regulation voltage input to a generator control unit;
  monitoring a generator output voltage as a backup point of regulation voltage input;
  detecting an overvoltage fault at the point of regulation voltage input, the backup point of regulation voltage input, or both;
  opening a first solid-state switch at a blocking circuit using analog control to prevent provision of an input signal to a generator excitation field, wherein the first solid-state switch is opened when a voltage of the input signal is above a voltage threshold that induces the generator output voltage to an overvoltage fault value;
  opening a generator excitation field relay in response to detecting the overvoltage fault; and
  opening a second solid-state switch at a blocking circuit in response to detecting that an input signal to the generator excitation field is above a voltage threshold that induces the generator output voltage to an overvoltage fault value.

17. The method of claim 16, wherein opening the first solid-state switch, opening the generator excitation field relay, or the second solid-state switch result in deenergizing the generator excitation field.

18. The method of claim 16, wherein the blocking circuit comprises a diode tuned with a breakdown voltage or a Zener voltage equal to the voltage threshold, a second solid-state switch is closed when the input signal exceeds the voltage threshold, and closing the second solid-state switch results in opening the first solid-state switch.

19. The method of claim 16, wherein opening the generator excitation field relay occurs after opening the first solid-state switch.

20. The method of claim 16, wherein the point of regulation voltage input to the generator control unit comprises a power signal provided to an electrical system of an aircraft.

* * * * *